(12) United States Patent
Zhang

(10) Patent No.: US 7,457,621 B2
(45) Date of Patent: Nov. 25, 2008

(54) METHOD FOR PREVENTING WIRELESS LOCAL AREA NETWORK FROM FREQUENT NETWORK SELECTION INTERACTION

(75) Inventor: Wenlin Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 502 days.

(21) Appl. No.: 11/349,610

(22) Filed: Feb. 8, 2006

(65) Prior Publication Data

US 2006/0194578 A1    Aug. 31, 2006

Related U.S. Application Data

(63) Continuation of application No. PCT/CN2004/000903, filed on Aug. 5, 2004.

(30) Foreign Application Priority Data

Aug. 8, 2003   (CN) .............................. 03 1 53319

(51) Int. Cl.
*H04Q 7/20* (2006.01)
(52) U.S. Cl. .............. 455/435.2; 455/435.1; 455/435.3; 455/436; 455/433; 455/434
(58) Field of Classification Search .............. 455/435.1, 455/435.2, 435.3, 436, 433, 434
See application file for complete search history.

(56) References Cited

U.S. PATENT DOCUMENTS

| 7,089,001 | B2 * | 8/2006 | Leung et al. ................. 455/433 |
| 7,184,768 | B2 * | 2/2007 | Hind et al. ................. 455/435.3 |
| 2002/0068574 | A1 * | 6/2002 | Vestergaard et al. ........ 455/445 |
| 2003/0061503 | A1 | 3/2003 | Katz et al. .................. 713/200 |

(Continued)

FOREIGN PATENT DOCUMENTS

GB    2 363 951    1/2002

(Continued)

OTHER PUBLICATIONS

International Search Report for PCT/CN2004/000903, dated Dec. 9, 2004.

(Continued)

*Primary Examiner*—Rafael Pérez-Gutiérrez
*Assistant Examiner*—Aung T Win
(74) *Attorney, Agent, or Firm*—Marshall, Gerestein & Borun LLP

(57) ABSTRACT

The present invention discloses a method for preventing Wireless Local Area Network (WLAN) from frequent network selection interaction. Every time it is needed to issue the information of operating networks of mobile communications, decide according to the number of times for which the information has been issued in a defined period of time whether the information of operating networks of mobile communications is allowed to be issued. If allowed, go ahead with issuing the information of operating networks of mobile communications and record the number of times for which the information has been issued; otherwise, stop issuing the information. When the decision period changes, update the issuing record. When a request for issuing information is received after the issuing has been stopped, discard the request or issue the information after a delay. This invention can prevent WLAN from suffering congestion induced by the network selection mechanism or attacks launched by malicious UEs.

28 Claims, 8 Drawing Sheets

U.S. PATENT DOCUMENTS

2003/0186695 A1* 10/2003 Bridges et al. .............. 455/432

FOREIGN PATENT DOCUMENTS

JP          2002359863       12/2002

OTHER PUBLICATIONS

3GPP, "3rd Generation Partnership Project; Technical Specification Group Service and System Aspects; Wireless Local Area Network (WLAN) Interworking Security; (Release 6)," 3GPP TS 33.cdt v0.1.0 (2002).

3GPP, "3rd Generation Partnership Project; Technical Specification Group Service and System Aspects; 3GPP System to Wireless Local Area Network (WLAN) Interworking; System Description (Release 6)," 3GPP TS 23.234 v1.10.0 (2003).

3GPP, "3rd Generation Partnership Project; Technical Specification Group Service and System Aspects; Service Accessibility (Release 6)," 3GPP TS 22.011 v6.1.0 (2003).

European Office Action for Application No. 04762039.8-2416, dated Jul. 5, 2006.

European Office Action for Application No. 04762039.8-2416, dated Mar. 16, 2007.

European Search Report for Application No. 04762039.8-2416, dated Jun. 22, 2006.

* cited by examiner

METHOD FOR PREVENTING WIRELESS LOCAL AREA NETWORK FROM FREQUENT NETWORK SELECTION INTERACTION

CROSS-REFERENCES TO RELATED APPLICATIONS

This is a continuation of International Application No. PCT/CN2004/000903, which was filed on Aug. 5, 2004, and which, in turn, claimed the benefit of Chinese Patent Application No. 03153319.1, which was filed on Aug. 8, 2003, the entire disclosures of which are hereby incorporated herein by reference.

BACKGROUND OF THE DISCLOSURE

1. Field of the Technology

The present invention relates to network accessing techniques and, more particularly, to a method for preventing a Wireless Local Area Network (WLAN) from frequent network-selection interaction.

2. Background of the Invention

At users' demand for an increasingly high rate of wireless access, there emerges WLAN, which is able to provide high-rate wireless data access in a relatively small area. Various techniques have been used in the WLAN, among which a technical standard with more applications is IEEE 802.11b. This standard utilizes the frequency band of 2.4 GHz with a data transmission rate up to 11 Mbps. Other technical standards utilizing the same frequency band include IEEE 802.11g and the Bluetooth, wherein the data transmission rate of IEEE 802.11g is up to 54 Mbps. There are other new standards such as IEEE 802.11a and ETSI BRAN Hiperlan2 which use the frequency band of 5 GHz with the transmission rate up to 54 Mbps as well.

Although there are various standards for wireless access, most WLANs are used for transferring IP data packets. The specific WLAN access standard adopted by a wireless IP network is usually transparent to the upper-level IP. Such a network is typically configured with Access Points (AP) for implementing wireless access of WLAN User Equipment (WLAN UE), and with network controlling and connecting devices for implementing IP transmission.

Along with the rise and development of WLAN, focus of research is shifting to the inter-working of WLAN Access Network (WLAN AN) with various mobile communications networks, such as GSM, CDMA, WCDMA, TD-SCDMA, and CDMA2000. In accordance with 3GPP standards, WLAN UE may be connected with the Internet and Intranet via a WLAN AN, and also be connected with a home network or visited network of 3GPP system through a WLAN AN. To be specific, when getting accessed locally, a WLAN UE will be connected with the 3GPP home network via a WLAN AN, as shown in FIG. 2. When roaming, it will be connected with a 3GPP visited network via the WLAN AN. Some entities of the 3GPP visited network are connected with the corresponding entities of the 3GPP home network, for instance, the 3GPP Authentication Authorization Accounting (AAA) proxy in the visited network is connected with the 3GPP AAA server in the home network, and the WLAN Access Gateway (WAG) in the visited network is connected with the Packet Data Gateway (PDG) in the home network, as shown in FIG. 1. FIG. 1 and FIG. 2 are the schematic diagrams illustrating the networking architectures for a WLAN inter-working with a 3GPP system under the roaming and non-roaming circumstances, respectively.

As shown in FIG. 1 and FIG. 2, a 3GPP system primarily comprises Home Subscriber Server (HSS)/Home Location Register (HLR), 3GPP AAA server, 3GPP AAA proxy, WAG, PDG, Charging Gateway (CGw)/Charging information Collecting Function (CCF), and Online Charging System (OCS). WLAN UE, WLAN AN, and all the entities in the 3GPP system together constitute a 3GPP-WLAN inter-working network, which can be regarded as a WLAN service system. The WLAN AN and the 3GPP system are generally called the network side or the WLAN as a whole. In this service system, the 3GPP AAA server is in charge of authentication, authorization, and accounting of WLAN UE, collecting the charging information sent from the WLAN AN and transferring the information to the charging system; the PDG is in charge of user data transmission from the WLAN AN to the 3GPP network or other packet data networks; and the charging system mainly receives and records the charging information of WLAN UE transferred from the network while the OCS instructs the network to transmit online charging information periodically in accordance with the expenses of the online charged users, makes statistics and performs control.

Under the non-roaming circumstances, when a WLAN UE desires to access directly to the Internet/Intranet, the WLAN UE can access to Internet/Intranet via a WLAN AN after it accomplishes authentication with the AAA server (AS). If the WLAN UE wants to access the service of 3GPP packet switched (PS) domain as well, it may further request the service of Scenario 3 from the 3GPP home network. That is, the WLAN UE initiates a service authorization request for Scenario 3 to the AS of the 3GPP home network, which will carry out service authentication and authorization for that request; if the authentication and authorization succeeds, the AS will send an access accept message to the WLAN UE and assign a corresponding PDG for the WLAN UE. When a tunnel is established between the WLAN UE and the assigned PDG, the WLAN UE will be able to access the service of 3GPP PS domain. Meanwhile, the offline charging system and the OCS record the charging information according to the WLAN UE's occupation of the network. Under the roaming circumstances, when a WLAN UE desires to access directly to the Internet/Intranet, it will apply to the 3GPP home network through a 3GPP visited network for accessing the Internet/Intranet. If the WLAN UE also desires to request the service of Scenario 3 and access the service of the 3GPP PS domain, the WLAN UE needs to initiate a service authorization process at the 3GPP home network via the 3GPP visited network. The authorization is likewise carried out between the WLAN UE and the AS of 3GPP home network. After the authorization succeeds, the AS assigns a corresponding home PDG for the WLAN UE, then the WLAN UE will be able to access the service of 3GPP PS domain of the home network after it establishes a tunnel with the assigned PDG via the WAG of the 3GPP visited network.

As shown in FIG. 3, in a 3GPP-WLAN inter-working network, if a WLAN is connected at the same time with a plurality of 3GPP visited networks, that is, with a plurality of operating networks of mobile communications, wherein the 3GPP visited networks refer to Visited Public Land Mobile Networks (VPLMN), then it will be necessary for a WLAN UE to select a desired VPLMN to access after the WLAN UE accesses the WLAN. For instance, in China, a WLAN AN may be connected simultaneously with two operating VPLMNs, China Mobile and China Unicom. When a user of China Unicom is trying to get accessed via the WLAN, this user needs to instruct the WLAN AN to access to an operating VPLMN of China Unicom. For another instance, if a French user roams to a WLAN in China and the home network of the French user has roaming protocols with both China Mobile and China Unicom, the French user needs to select a VPLMN to access after accessing to the WLAN which is connected with both China Mobile and China Unicom.

A scheme for network selection is proposed in another patent application, which is illustrated by Steps 401~408 in FIG. 4. When a WLAN UE accesses to the 3GPP-WLAN inter-working network through the WLAN, an access authentication is performed between the WLAN UE and the network after the WLAN UE establishes a wireless connection with the WLAN Access Network. It should be clear that, the access authentication includes the whole procedure of authentication and authorization. Moreover, the network will request the UE for User Identifier. Then, the UE delivers a response message which carries the network selection information to the WLAN Access Network, and the WLAN Access Network identifies the operating network of mobile communications that the UE is going to access according to the carried network selection information. If the network selection information can be identified, the UE will be connected to the selected network for access authentication and follow-up operations. If the UE carries no network selection information or the carried network selection information can not be identified, i.e. the indicated network is not connected with the WLAN directly, the network will issue the information of operating networks of mobile communications to the UE so as to inform the UE of the operating networks of mobile communications connected with the WLAN and make a selection by the UE. The network selection information refers to the information of the operating network of mobile communications the UE is going to access, which can be put in a separately-configured field, or in the user identifier field defined with the format of Network Access Identifier (NAI).

In the case when the information of the operating networks of mobile communications needs to be issued, if a malicious user delivers network selection information again and again which can not be identified by the WLAN Access Network, the network will have to issue the information of the operating networks of mobile communications to the UE repeatedly. Since there is much information of the operating networks of mobile communications for a UE to select, continuous and repeated transmission of such information will result in unnecessary network load and lead the network to be busi-engaged, even shut down the normal services. Moreover, it is easy for a malicious user to attack the network by means of this loophole, and since no authentication of the UE has been made at this time, it is hard to track and find out the malicious user. So far, no one has proposed a specific solution to this loophole.

SUMMARY OF THE INVENTION

In view of the above, the invention is to provide a method for preventing WLAN from frequent network selection interaction so as to ensure that the WLAN does not get into congestion induced by the network selecting mechanism or suffer the attacks from malicious UE.

The technical scheme of the present invention is as follows: A method for preventing WLAN from frequent network selection interaction, the method comprising:
a. after a wireless connection between a WLAN UE and a WLAN Access Network has been established, the WLAN UE delivering network selection information to the WLAN Access Network during the interaction of access authentication initiated by the network side or the WLAN UE;
b. the network side deciding whether the received network selection information belongs to an operating network of mobile communications the WLAN Access Network connects with, if yes, sending the access authentication request from the WLAN UE to the operating network of mobile communications identified by the network selection information.

If the received network selection information does not belong to the operating networks of mobile communications the WLAN Access Network connects with, the method further comprises:
c. deciding whether information of the operating networks of mobile communications is allowed to be issued according to the number of times for which the information has been issued in a defined period of time; if yes, issuing the information of operating networks of mobile communications to the UE, and recording the number of times for which the information has been issued; otherwise, stopping issuing the information of operating networks of mobile communications, where the number of times for which the information has been issued is the number of times for which the information has issued by the network, or the number of failed identification for UE, or a combination of the above two.

The method further comprises: setting in advance the length of a decision time window and a moving step for issuing the information of operating networks of mobile communications, and the moving step is no more than the length of the decision time window. The decision time window may be the network decision time window, or the UE decision time window, or a combination of the above two.

The method further comprises: setting in advance an allowable total number of issuing times of the network within the network decision time window and an allowable number of issuing times within the moving step, and the allowable number of issuing times within the moving step is no more than the allowable total number of issuing times of the network within the network decision time window; then the number of times for which the information has been issued in step c comprises the number of times for which the information has been issued by the network, and the deciding in step c comprises: judging whether the number of times for which the information has been issued by the network exceeds the total number of issuing times of network, if yes, the information of operating networks of mobile communications is not allowed to be issued; otherwise, issue the information of operating networks of mobile communications.

The method further comprises: setting in advance an allowable total number of issuing times of single UE within the UE decision time window and an allowable number of issuing times within the moving step, and the allowable number of issuing times within the moving step is no more than the allowable total number of issuing times of single UE within the UE decision time window; then the number of times for which the information has been issued in step c comprises the number of failed identification for UE, and the deciding in step c comprises: first judging whether there is a record of failed identification for UE according to the UE identifier, if not, issue the information of operating networks of mobile communications; otherwise, judging whether the number of failed identification for UE is no more than the total number of issuing times of UE, if yes, issue the information of operating networks of mobile communications, otherwise, the information of operating networks of mobile communications is not allowed to be issued.

The method further comprises: setting in advance an allowable total number of issuing times of network within the network decision time window and an allowable number of issuing times within the moving step, and the allowable number of issuing times within the moving step is no more than the allowable total number of issuing times of network within the network decision time window; moreover, setting an allowable total number of issuing times of single UE within the UE decision time window and an allowable number of issuing times within the moving step in advance, and the allowable number of issuing times within the moving step is no more than the allowable total number of issuing times of UE within the UE decision time window; then the number of times for which the information has been issued in step c comprises the number of times for which the information has been issued by the network and the number of failed identification for UE, and the deciding in step c comprises: first judging whether the number of times for which the information has been issued by the network exceeds the total number of issuing times of network, if yes, the information of operating networks of mobile communications is not allowed to be issued; otherwise, judging whether there is a record of failed identification for UE according to the UE identifier, if not, issue the information of operating networks of mobile communications; otherwise, judging whether the number of failed identification for UE is no more than the total number of issuing times of UE, if yes, issue the information of operating networks of mobile communications, otherwise, the information of operating networks of mobile communications is not allowed to be issued.

In the above scheme, the UE identifier is Media Access Control (MAC) address identifier of the UE, or Network Access Identifier (NAI) of the UE, or account number of the UE, or IP address of the UE.

The method further comprises: when each decision time window moves one moving step forward, the new number of times for which the information has been issued within the decision time window is updated to the number of times for which the information has been issued minus the allowable number of issuing times within the moving step.

In the above scheme, the allowable number of issuing times within the moving step may be set as the quotient of the total allowable number of issuing times within the decision time window divided by the length of the decision time window. The length of decision time window, the length of a moving step, and the number of issuing times within the decision time window is determined by system performance, number of users of the network and network maintenance policy.

The method further comprises: setting the decision time window and the moving step as one parameter, then the method may further comprise: setting the total allowable number of issuing times within the decision time window and the allowable number of issuing times within the moving step as one parameter.

The method further comprises: after stopping issuing, recording the received request for issuing the information of operating networks of mobile communications that needs to be issued after a delay, and responding to the request when the delay time is up.

In step c, the network side issues the information of all the operating networks of mobile communications having connection with the WLAN Access Network to the UE, or issues the information of all the operating network of mobile communications having both connection with the WLAN Access Network, and roaming protocols with a home network of the UE.

In accordance with the method provided by the present invention for preventing WLAN from frequent network selection interaction, every time a UE requests the network for the information of operating networks of mobile communications, the UE identifier, such as the MAC address, or the NAI, or the account number, or the IP address of the UE will be recorded, and it is judged whether the UE has sent the request repeatedly during a defined period of time. If yes, stop responding or cutting off the connection at once. In this way, network congestion induced by frequent network selection by WALN UE and frequent triggering of the procedure of issuing the information of operating networks of mobile communications can be avoided. Moreover, attacks from malicious UE by using the network loophole can be prevented, and the network load can be reduced to a certain extent. As a result, network response speed and transmission speed are increased.

In addition, if some WLAN do not wish a certain UE to learn the PLMN which has no relationship with the UE but is directly connected with the WLAN, the WLAN will issue to the UE only a list of VPLMNs having roaming relationship with the HPLMN of the UE. But if the UE pretends to be from a different HPLMN using a different NAI, the related VPLMN will be found out by polling. Then, the judging and constraining mechanism provided by the present invention can be employed to avoid the above problem.

DETAILED DESCRIPTION OF PREFERRED EMBODIEMENTS

Figure 1:
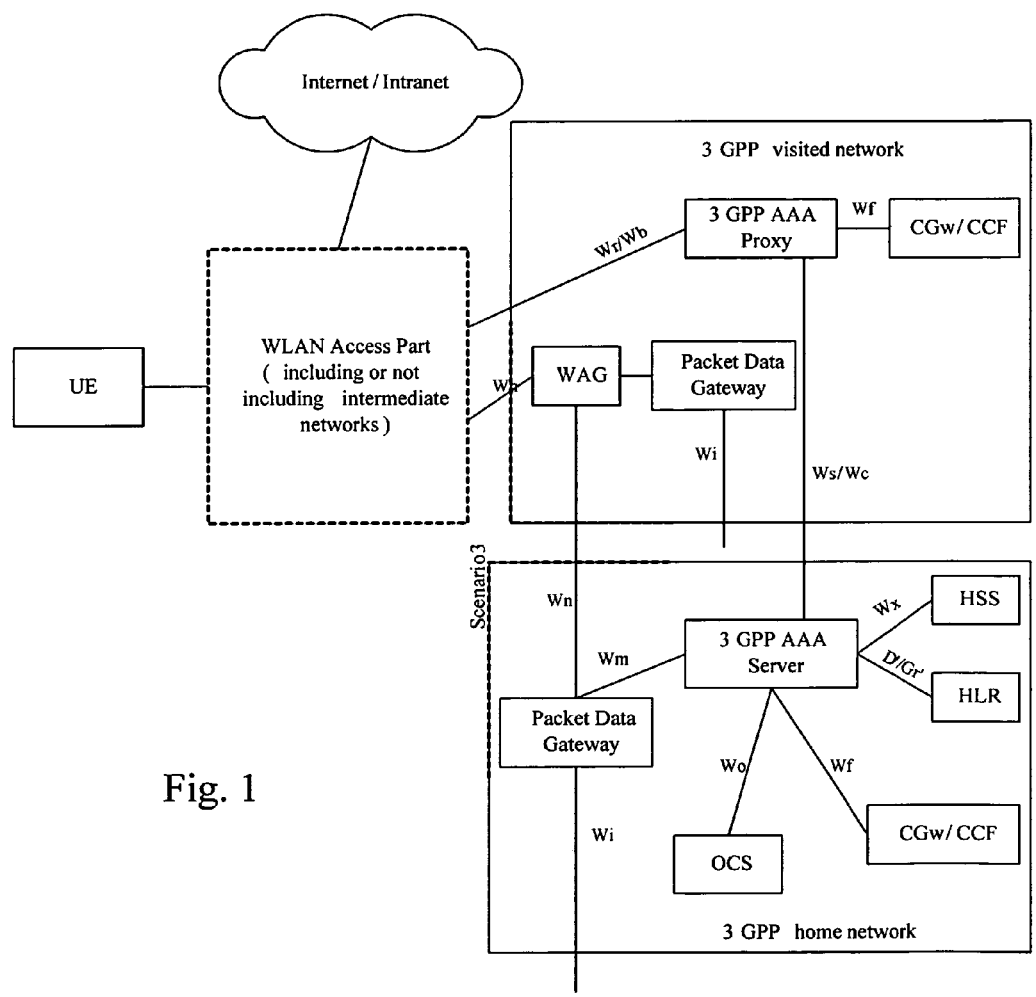
FIG. 1 is a schematic diagram illustrating the network architecture of inter-working WLAN system and 3GPP system under the roaming circumstances.
Figure 2:
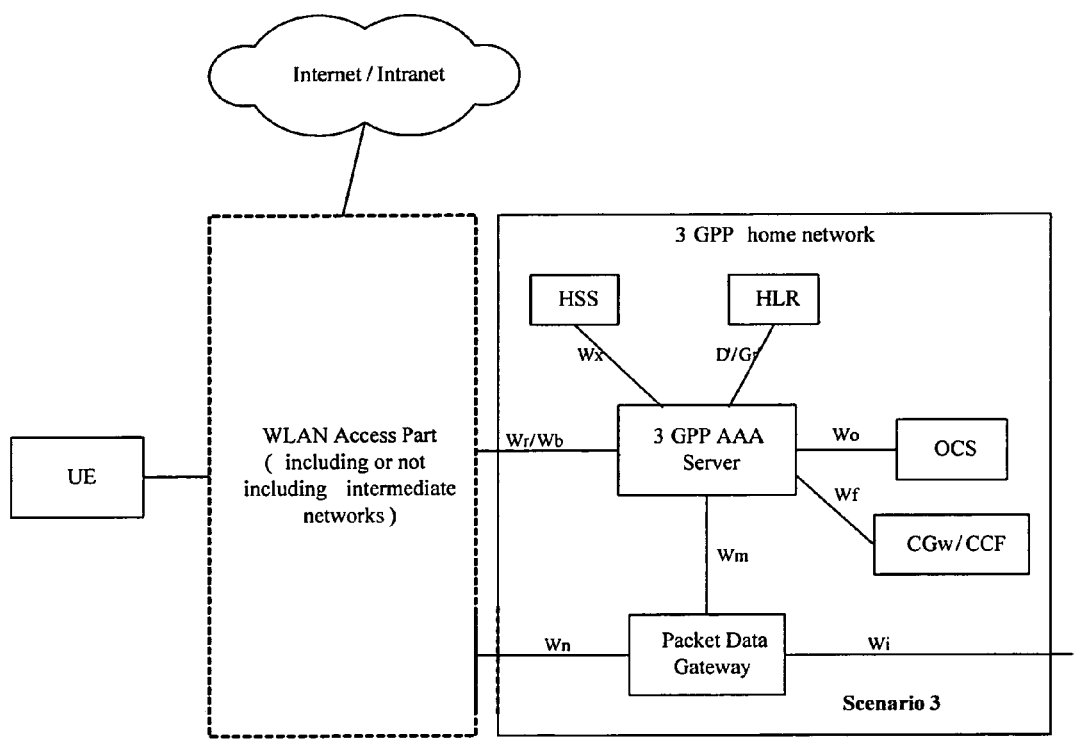
FIG. 2 is a schematic diagram illustrating the network architecture of inter-working WLAN system and 3GPP system under the non-roaming circumstances.
Figure 3:
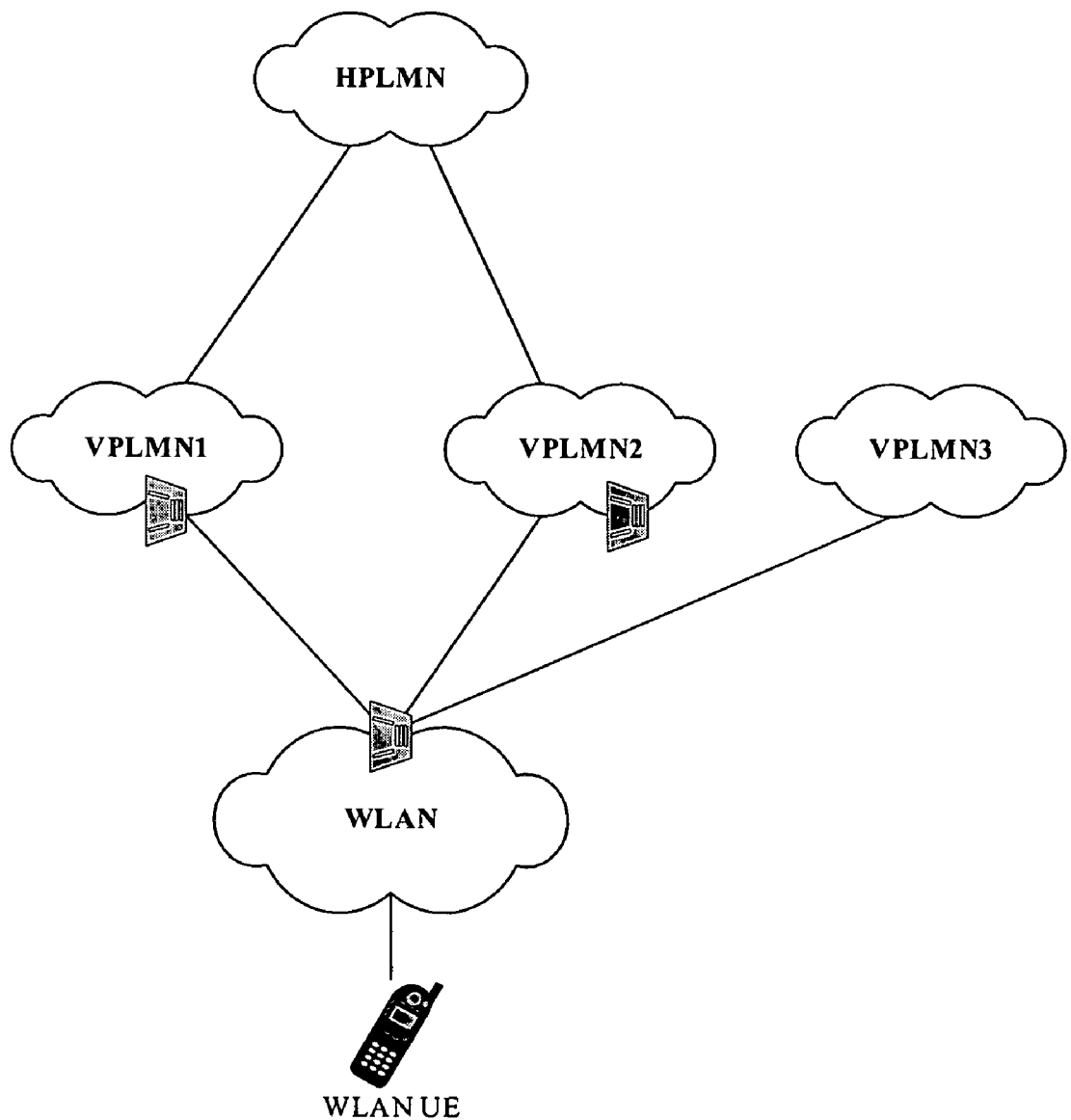
FIG. 3 is a schematic diagram illustrating the network architecture of a WLAN connected with a plurality of visited networks.
Figure 4:
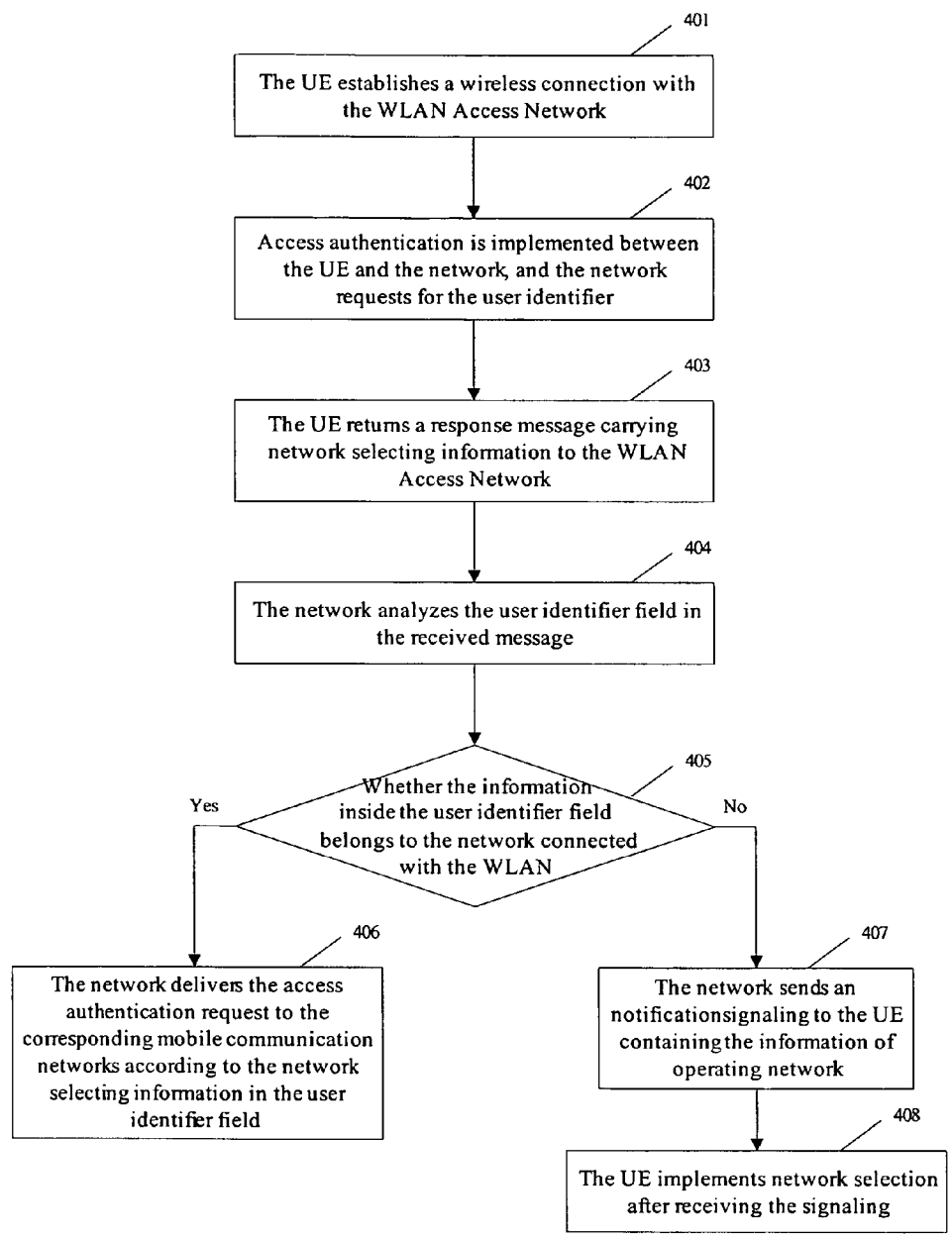
FIG. 4 is the flowchart of the interactive process of a UE selecting an operating network of mobile communications to access in the prior art.
Figure 5:
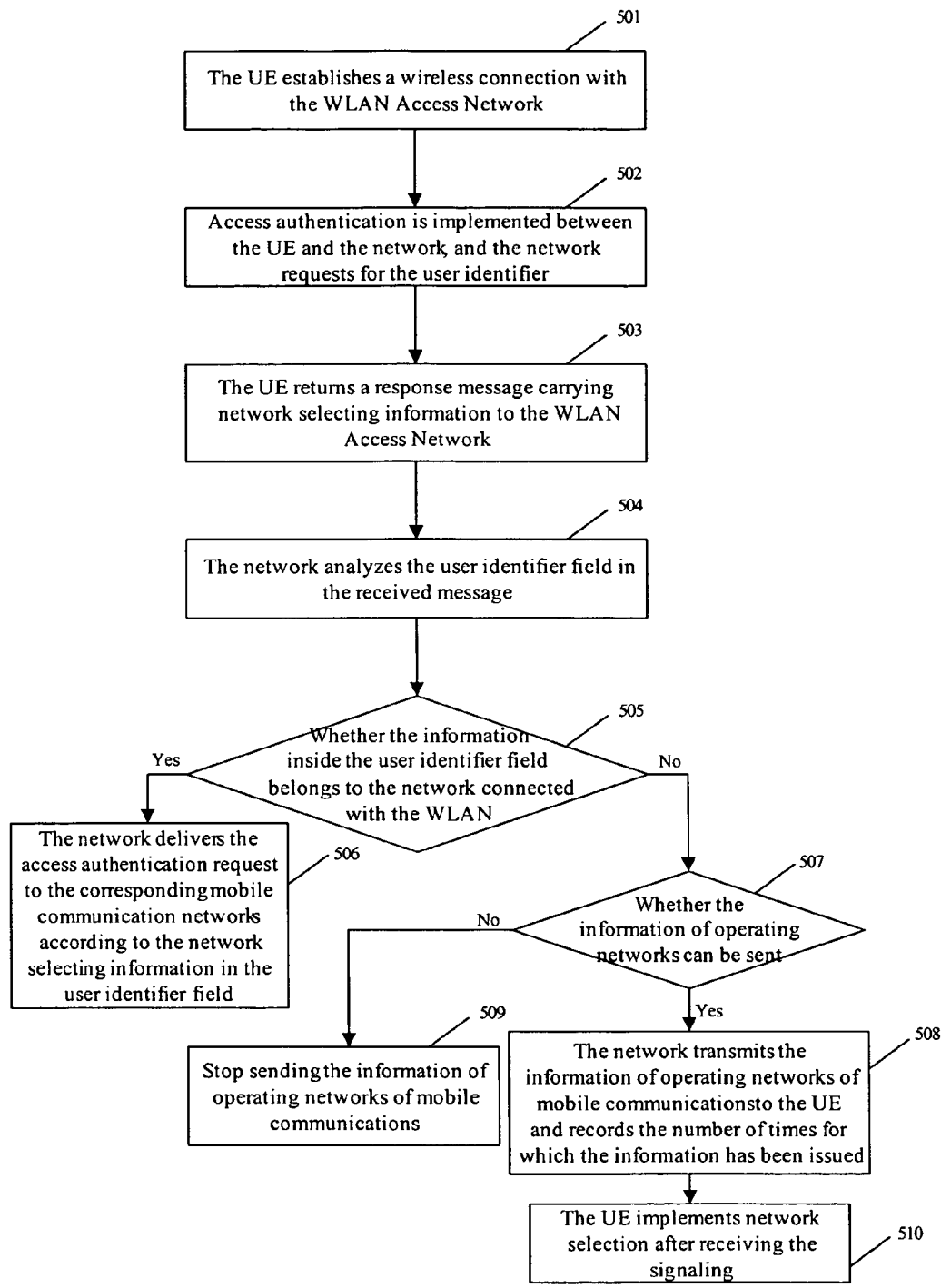
FIG. 5 is the flowchart of the interactive process of a UE selecting an operating network of mobile communications to access in the present invention.

Based on the network architecture shown in FIG. 3, the main idea of the present invention for preventing WLAN from frequent network selection interaction is: in case of needing to issue the information of operating networks of mobile communications, every time when the information of operating networks of mobile communications is issued, judgment will be made first according to the number of times for which the information has been issued in a defined period of time on whether the information of operating networks of mobile communications is allowed to be issued or not. If allowed, go on to issue the information of operating networks of mobile communications and record the number of times for which the information has been issued, otherwise, stop issuing the information. When the decision period changes, update the issuing record. When a request for issuing the information is received after the issuing has been stopped, discard the request without response or issue the information after a delay. The specific implementing process is shown in FIG. 5, which comprises the steps of:

Steps 501~506 are completely the same as Steps 401~406 in the prior art.

In practical applications, if the received network selection information does not belong to the operating network of mobile communications associated with the WLAN according to the judgment in Step 405, the network will send notification signaling to the WLAN UE, and the WLAN UE completes the subsequent operation according to the notification signaling. Here, there are two modes of notification signaling sent from the network to the UE, one is that the notification signaling directly contains the information of operating networks of mobile communications that the network wants to issue, then the WLAN UE or the user can select from the information directly; the other is that the notification signaling is only used for informing the UE that the selected information of operating networks of mobile communications is invalid and instructing the UE to download the information, then the UE can decide according to its need whether to request the network for the information of operating networks of mobile communications. This invention only aims at the first mode, i.e. all the networks issue the information of operating networks of mobile communications to the UE through the notification signaling.

Step 507~510: Decide whether the information of operating networks of mobile communications is allowed to be issued to the UE. If allowed, issue the information of operating networks of mobile communications to the UE, and record the number of times for which the information has been issued. On receipt of the information of operating networks of mobile communications, the UE performs network selection according to the information. If not allowed, stop issuing the information of operating networks of mobile communications. When the decision period changes, update the issuing record. When a request for issuing the information is received after the issuing has been stopped, discard the request without response or delay the issuing. In case of delayed issuing, record the received request for issuing the information of operating networks of mobile communications that needs to be issued after a delay, respond to this request when the delay time is up and issue the information.

In Step 507, whether the information of operating networks of mobile communications is allowed to be issued is judged according to the number of times for which the information has been issued within a certain period of time. The number of times for which the information has been issued may comprise the number of times for which the information has been issued by the network, or the number of failed identification for UE, i.e. the number of times for which the information has been issued by the UE, or the number of times for which the information has been issued by the network and the number of failed identification for UE. When the number of failed identification for UE is recorded, the UE identifier is recorded as well. Moreover, the information of operating networks of mobile communications provided by the network for the UE for making network selection is stored in a special network information storing unit, which typically comprises the following parameters: the name of the network, network bearer capacity, QoS, the bandwidth, service capacity, inter-working WLAN Scenarios which can be provided, the charging rate, service type, and so on. When the network issues the information of operating networks of mobile communications associated with the WLAN, it issues the information of all the operating networks of mobile communications which have connection with the WLAN Access Network, or only issues the information of visited networks which have roaming agreements with the home network indicated by the UE. If there is no such a visited network, the network may issue no information or inform the user that no roaming agreements exist.

In connection with the above scheme, there are three approaches to stop issuing the information:

One is to preset a network decision time window and the length thereof, and give an allowable total number of issuing times within the decision time window. If the number of times for which the information has been issued exceeds the total number, stop issuing the information. For example, preset a network decision time window as 20 minutes, and the total number of issuing times within this 20 minutes is 500. If the information has been issued for 500 times in less than 20 minutes, and another issuing would be counted as the 501st, the information will not be issued anymore. Of course, in the next 20 minutes, the record will be updated and the decision will be made again. Here, the preset decision time window is dynamic, i.e. the starting point of the decision time window can be set at any time and the window keeps moving with a moving step no more than its length. Moreover, an allowable number of issuing times within the moving step will be set, which is no more than the total number of issuing times of the network. For example, take a static moment as a reference point and set the moving step of the decision time window as 1 minute, then there will be a 20-minute decision time window between the 1st minute and the 21st minute starting from the reference point, and there will be a new 20-minute decision time window between the 2nd minute and the 22nd minute starting from the reference point. The updating of the issuing record in the decision time window is to subtract the allowable number of issuing times within the moving step from the number of issuing times for which the information has so far been issued. The allowable number of issuing times within the moving step can be set as the quotient of the total number of issuing times of the network divided by the length of the network decision time window, then whenever moving a step forward, the number of issuing times for which the information has been issued will be reduced by such a quotient. To be specific, the allowable number of issuing times within the moving step=500 times/20 minutes=25 times/min. Then, every time 1 minute passes, the number of issuing times for which the information has been issued will be reduced by 25, and if the original number of issuing times for which the information has been issued is less than 25, the number will be directly set as 0. This scheme of determining allowable number of issuing times within the moving step by the length of the decision time window and the allowable total number of issuing times within this window can also be used to implement intelligent adjustment and control of network congestion, where the length of the decision time window and the moving step are determined by the system performance, the number of network users and the network maintenance policy.

Another approach is to preset a UE decision time window and the length thereof, and set an allowable number of issuing times for the network to issue the information of operating networks of mobile communications to each UE within the decision time window. A moving step of the decision time window and an allowable number of issuing times within the moving step are also set, and the allowable number of times within the moving step is less than that within the decision time window. The identifier of the destination UE to which the information of operating networks of mobile communications is issued will be recorded every time, which can be the NAI, the MAC address, the account number or the IP address of the UE. A judgment will be made according to the UE identifier on whether the number of times for which the information of operating networks of mobile communications has been issued to the UE exceeds the preset number. If the number is exceeded, stop issuing the information. For example, the decision time window is set as 20 minutes beforehand, and the information may be issued to each UE 20 times at most within each 20 minutes; then no more information will be issued when the information has been issued to the UE for 20 times in less than 5 minutes. Obviously, the record will be updated and the judgment will be made again in the next 20 minutes. In the case of controlling the number of issuing times to each user, responses to UE which continuously requests the issuing will be controlled by adjusting the moving step and allowable number of issuing times within the moving step. For example, the moving step of the UE decision time window is set as 5 minutes, and the allowable number of issuing times within the moving step is as 5 or 3, then at the beginning of the next 20 minutes, i.e. from the 5th minute to the 25th minute, the record will be updated. To be specific, there have been 20 times of issuing recorded before the 5th minute, then at the 5th minute the recorded number of issuing will be reduced by 5 or 3, i.e. the UE is permitted to try another 5 or 3 times.

The maximum length of a moving step can be equal to the length of the decision time window, i.e. 20 minutes, then at the beginning of every next decision time window the record of issuing times can be reset to 0 if the allowable number of issuing times within a moving step is also 20 times. The number of issuing times within a moving step can also be set as required, for example, set as 8 times, then the record of issuing times can only be subtracted by 8 in the next 20 minutes. In this way, if the UE uses (e.g. the information is issued to the UE) more than 8 times within the first 20 minutes, i.e. from the 1st to the 20th minute, such as 15 times, the allowable number of issuing times will be less than 20 times in the second 20 minutes (from the 21st to the 40th minute), i.e. 20-(15-8)=13 times.

Here, different total numbers of issuing times may be set for each UE, or a unified number of issuing times set for all UE, and the decision time window is still dynamic. In addition, the MAC address of UE can be obtained from an Access Controller (AC).

The third approach is as follows: Preset a network decision time window, a UE decision time window, and the lengths of both windows, and set at the same time the total number of issuing times within the network decision time window and the total number of issuing times within the UE decision time window. Judgment will be made first on whether the number of issuing times for which the information has been issued by the network exceeds the network total number of issuing times. If yes, stop issuing; otherwise, find out whether there is an issuing record for the UE according to the UE identifier. If the record does not exist, issue the information directly; otherwise, make another judgment on whether the number of failed identification for UE exceeds the UE total number of issuing times. If yes, stop issuing; otherwise, issue the information. Here, the decision time window is still dynamic.

In the above three approaches, the network decision time window and the UE decision time window can be two different decision time windows, having different lengths and different moving steps while set with different allowable number of issuing times and different updating numbers for the corresponding moving steps. Or the network decision time window and the UE decision time window can be the same. The lengths of a decision time window and the moving step thereof may be set as equal or different. In implementation, the decision time window and the moving step can be combined and set as one parameter, for example, as a decision time unit. In this case, the moving step will be always equal to the length of the decision time window, which makes the implementation and parameter setting simplified. Likewise, if the allowable number of issuing times within the moving step and the allowable number of issuing times within the decision time window are set to be equal, the two parameters can also be combined as one, for example, as allowable number of issuing times within the decision time unit. In this way, when the four parameters are combined into two, deciding whether to issue the information will be simplified to deciding whether it is allowed to issue the network information to UE according to the allowable number of issuing times within a time unit. Obviously, even if the decision time window and the moving step are combined as one, the allowable number of issuing times within the moving step and the allowable number of issuing times within the decision time window can be set separately, and under these circumstances, the allowable number of issuing times within the moving step is used to update the record of issuing times, and the allowable number of issuing times within the decision time window is used as basic allowable number of issuing times within the decision time unit.

According to the network capacity, one of the above three approaches for stopping issuing information can be chosen and used to enhance the defence against various attacks. In terms of identifying UE, MAC address is better than NAI.

By the above three approaches, it is possible to delay the issuing of information requested after issuing is stopped. The specific method is as follows: set a delay time in advance, start timing from the stopping moment, and respond to the requests by issuing information when the time is up. In the case of setting the decision time window and the moving step as the same parameter, delayed issuing may comprise issuing information at the beginning of the next decision time unit; or a delay time may be set in advance and the timing is started from the stopping moment, when the delay time is up, respond to these requests by issuing the information. In the latter case, if the delay time is longer than the remaining time in the decision time unit, it depends on specific needs whether to use the delay time or the decision time unit as the standard for deciding that the time is up.

Figure 6:
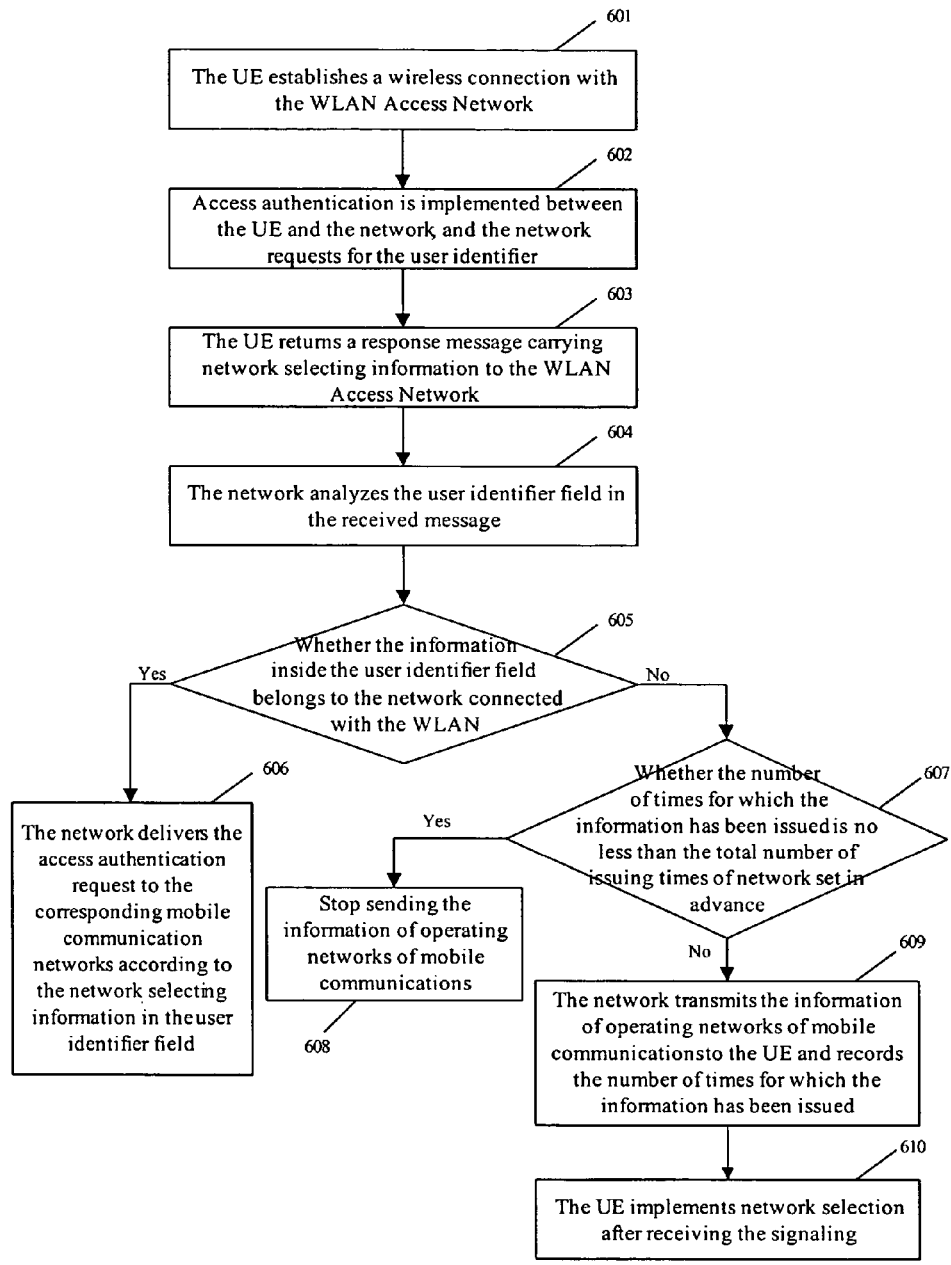
FIG. 6 is the flowchart of the interactive process of a UE selecting an operating network of mobile communications to access in an embodiment of the present invention.
Figure 7:
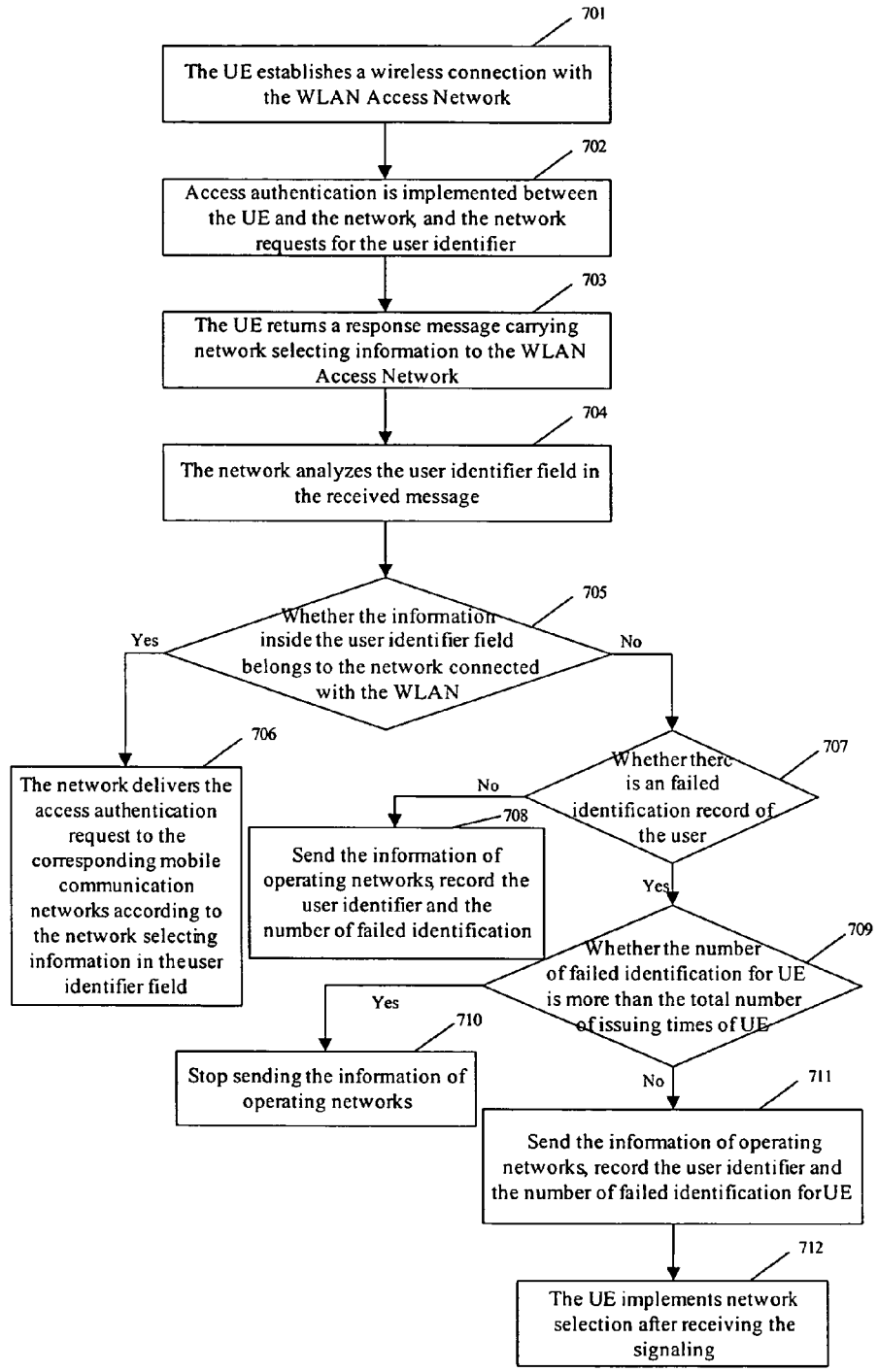
FIG. 7 is the flowchart of the interactive process of a UE selecting an operating network of mobile communications to access in another embodiment of the present invention.
Figure 8:
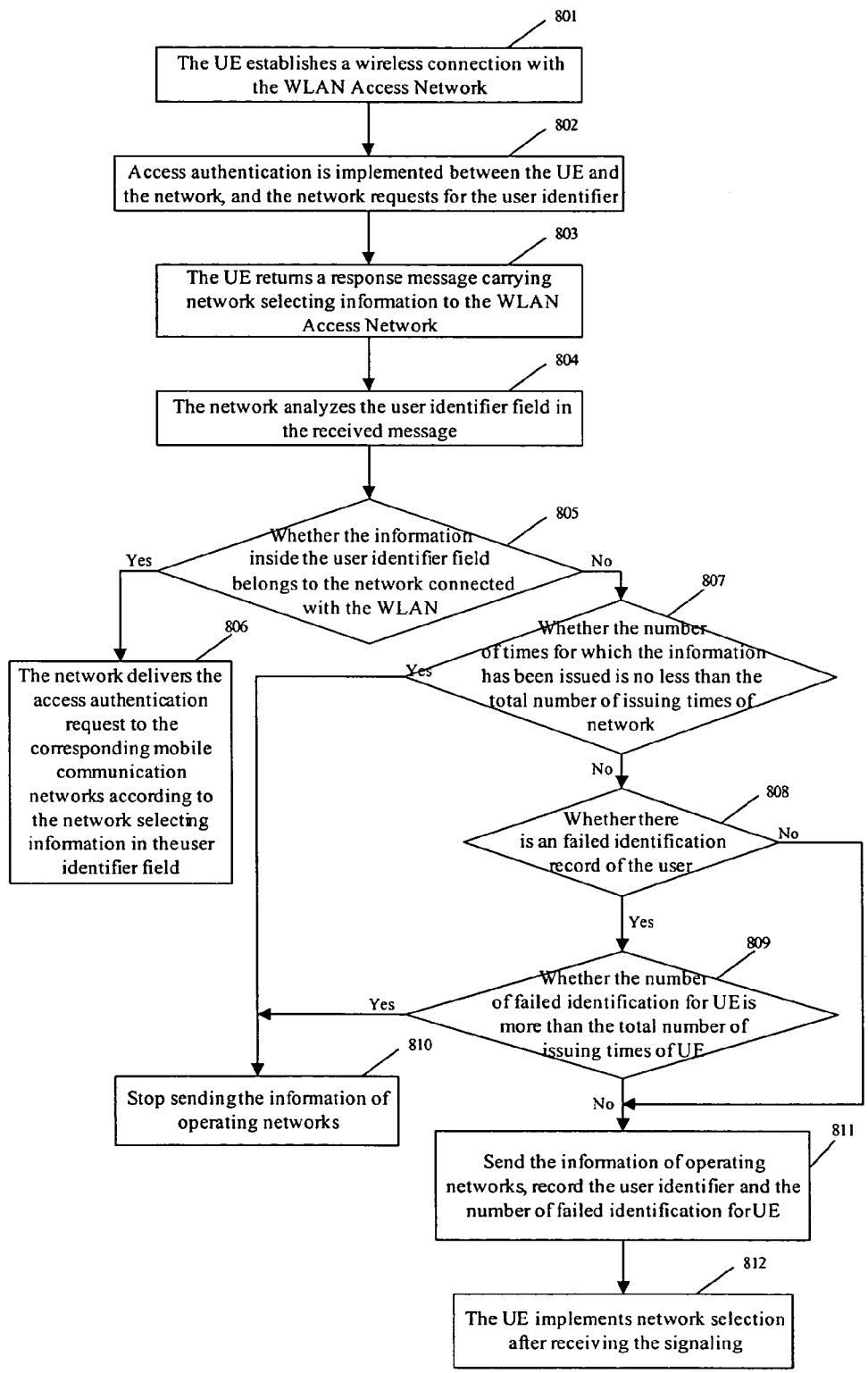
FIG. 8 is the flowchart of the interactive process of a UE selecting an operating network of mobile communications to access in yet another embodiment of the present invention.

FIGS. 6~8 show three embodiments corresponding to the above three approaches for stopping information issuing. As shown in Steps 607~609, the condition for stopping information issuing in FIG. 6 is whether the number of issuing times for which the information has been issued reaches the network total number of issuing times. As shown in Steps 707~711, whether or not to stop information issuing depends on a combined judgment on whether there is a record of failed identification for the UE identifier and whether the number of failed identification for UE is greater than the total number of issuing times for the UE. As shown in Steps 807~811, whether or not to stop information issuing depends on combined judgments on whether the number of times for which the information has been issued is no less than the network total number of issuing times, whether there is a record of failed identification for the UE identifier, and whether the number of failed identification has reached the total number of issuing times for the UE, where the number of failed identification in Step 809 represents the number of issuing times for which the information has been issued for the UE. Steps 601~606 and 610 in FIG. 6, Steps 701~706 and 712 in FIG. 7, and Steps 801~806 and 812 in FIG. 8 are the same as Steps 501~606 and 510 in FIG. 5, respectively.

In the present invention, resuming issuing refers to stopping issuing if the number of issuing times within the decision time window has reached the total number of times set in advance, and resuming issuing when the next time unit starts. For example, both the decision time window and the moving step are set as 20 minutes, and the total number of issuing times is set as 50 times within each 20 minutes; if the information has been issued 50 times within the first 10 minutes, no information will be issued in the next 10 minutes, and the information issuing will be resumed at the beginning of the next 20 minutes when the record is updated.

Based on the above ideas, when a malicious user tries to access to the network repeatedly by using an unidentifiable NAI, since the same NAI carrying unidentifiable network selection information appears repeatedly in a defined period of time, the undesirable issuing of information of operating networks of mobile communications can be stopped by using the schemes of the present invention. In this way, UEs are prevented from repeatedly triggering the procedure of issuing the information of operating networks of mobile communications by using the same NAI unidentifiable to the network.

In connection with the overload on network, it is possible to avoid network congestion by controlling the total number of issuing the information of operating networks of mobile communications by the network within a defined period of time. In this way, though the access speed of a normal user may be affected, the network as a whole will not be affected by the overload caused by network selection.

In the case when a malicious user tries repeatedly to trigger information issuing by using the NAI of a legal user so that the legal user could not receive the issued information normally to make network selection, the MAC address may be used to make recognition. Since there is a record of the user who has failed to pass authentication or has made unidentifiable network selection or to whom the network has issued the information of operating networks of mobile communications, response will not be given if the user identified by the same MAC address initiates unidentifiable network selection, i.e. sends unidentifiable NAI to the network, again or repeatedly, thus preventing the user from attacking the network by changing its NAI constantly.

In a word, the invention can prevent various malicious attacks or network congestion. The foregoing, however, is just preferable embodiments of this invention, which should not be construed as limiting the protection range thereof.

The invention claimed is:

1. A method for preventing frequent network selection interaction of a Wireless Local Area Network (WLAN), the method comprising:
   (a) after a wireless connection between WLAN user equipment (UE) and a WLAN Access Network has been established, the WLAN UE delivering network selection information to the WLAN Access Network during an interaction of an access authentication initiated by a network side or the WLAN UE;
   (b) the network side deciding whether the network selection information belongs to an operating network of mobile communications with which the WLAN Access Network connects, and if yes, sending the access authentication request from the WLAN UE to the operating network of mobile communications identified by the network selection information; and
   (c) if the network selection information does not belong to the operating network, deciding whether information of the operating network is allowed to be issued based on a number of times for which the information has been issued in a defined period of time, and if yes, issuing the information of the operating network to the UE, and recording the number of times for which the information has been issued, and otherwise, stopping issuing the information of the operating network.

2. The method according to claim 1, further comprising the step of setting a decision time window and an increment in advance for issuing the information of the operating network, wherein the increment is no more than a length of the decision time window.

3. The method according to claim 2, wherein the length of the decision time window and the increment are determined by system performance, a number of network users and network maintenance policy.

4. The method according to claim 2, wherein the decision time window is a network decision time window, or a UE decision time window, or a combination of the network and UE decision time windows.

5. The method according to claim 4, further comprising the step of setting an allowable total number of issuing times within the network decision time window and an allowable total number of issuing times within the increment in advance, wherein the allowable total number of issuing times within the increment is no more than the allowable total number of issuing times within the network decision time window.

6. The method according to claim 5, wherein the allowable total number of issuing times within the increment is set as a quotient of the allowable total number of issuing times within the decision time window divided by the length of the decision time window.

7. The method according to claim 5, wherein the allowable total number of issuing times within the decision time window is determined by system performance, a number of network users and network maintenance policy.

8. The method according to claim 5, further comprising the step of setting the decision time window and the increment as one parameter.

9. The method according to claim 5, wherein the number of times for which the information has been issued is a number of times for which the information has been issued by the network, and wherein step (c) comprises the steps of judging whether the number of times for which the information has been issued by the network exceeds the total number of issuing times of network such that, if yes, the information of operating networks of mobile communications is not allowed to be issued, and otherwise, issuing the information of operating networks of mobile communications.

10. The method according to claim 9, further comprising: when each decision time window moves one step forward, the new number of times for which the information has been issued within the decision time window is updated as the present number of times for which the information has been issued minus the allowable number of issuing times within the moving step.

11. The method according to claim 4, further comprising: setting an allowable total number of issuing times of single UE within the UE decision time window and an allowable number of issuing times within the moving step in advance, and the allowable number of issuing times within the moving step is no more than the allowable total number of issuing times of UE within the UE decision time window.

12. The method according to claim 11, wherein the allowable number of issuing times within the moving step is set as the quotient of the total allowable number of issuing times within the decision time window divided by the length of this decision time window.

13. The method according to claim 11, wherein the number of issuing times within the decision time window is determined by system performance, number of network users and network maintenance policy.

14. The method according to claim 11, further comprising: setting the decision time window and the moving step as one parameter.

15. The method according to claim 11, wherein the number of times for which the information has been issued in step c is the number of failed identification for UE;
the deciding in step c comprising: first judging whether there is a record of failed identification for UE according to the UE identifier, if not, issue the information of operating networks of mobile communications; otherwise, judging whether the number of failed identification for UE is no more than the total number of issuing times of UE, if yes, issue the information of operating networks of mobile communications, otherwise, the information of operating networks of mobile communications is not allowed to be issued.

16. The method according to claim 15, wherein the UE identifier is Media Access Control (MAC) address of the UE, or Network Access Identifier (NAI) of the UE, or account number of the UE, or IP address of the UE.

17. The method according to claim 15, further comprising: when each decision time window moves one step forward, the new number of times for which the information has been issued within the decision time window is updated as the present number of times for which the information has been issued minus the allowable number of issuing times within the moving step.

18. The method according to claim 4, further comprising: setting an allowable total number of issuing times of network within the network decision time window and an allowable number of issuing times within the moving step in advance, and the allowable number of issuing times within the moving step is no more than the allowable total number of issuing times of network within the network decision time window; moreover, setting an allowable total number of issuing times of single UE within the UE decision time window and an allowable number of issuing times within the moving step in advance, and the allowable number of issuing times within the moving step is no more than the allowable total number of issuing times of UE within the UE decision time window.

19. The method according to claim 18, wherein the number of times for which the information has been issued in step c comprises the number of times for which the information has been issued by the network and the number of failed identification for UE;
the deciding in step c comprising: first judging whether the number of times for which the information has been issued by the network exceeds the total number of issuing times of network, if yes, the information of operating networks of mobile communications is not allowed to be issued; otherwise, judging whether there is a record of failed identification for UE according to the UE identifier, if not, issue the information of operating networks of mobile communications; otherwise, judging whether the number of failed identification for UE is no more than the total number of issuing times of UE, if yes, issue the information of operating networks of mobile communications, otherwise, the information of operating networks of mobile communications is not allowed to be issued.

20. The method according to claim 19, wherein the UE identifier is Media Access Control (MAC) address of the UE, or Network Access Identifier (NAI) of the UE, or account number of the UE, or IP address of the UE.

21. The method according to claim 19, further comprising: when each decision time window moves one step forward, the new number of times for which the information has been issued within the decision time window is updated as the present number of times for which the information has been issued minus the allowable number of issuing times within the moving step.

22. The method according to claim 18, wherein the allowable number of issuing times within the moving step is set as the quotient of the total allowable number of issuing times within the decision time window divided by the length of this decision time window.

23. The method according to claim 18, wherein the number of issuing times within the decision time window is determined by system performance, number of network users and network maintenance policy.

24. The method according to claim 18, further comprising: setting the decision time window and the moving step as one parameter.

25. The method according to claim 24, characterized in that, the method further comprising: setting the total allowable number of issuing times within the decision time window and the allowable number of issuing times within the moving step as one parameter.

26. The method according to claim 1, further comprising: after stopping issuing, recording the received request for issuing the information of operating networks of mobile communications that needs to be issued after a delay, and responding to the request when the delay time is up.

27. The method according to claim 1, wherein in step c, the network side issues to the UE the information of all the operating networks of mobile communications having connection with the WLAN Access Network.

28. The method according to claim 1, wherein in step c, the network side issues to the UE the information of all the operating networks of mobile communications having connection with the WLAN Access Network, and having roaming agreements with a home network of the UE.

* * * * *